United States Patent [19]

Wheatley et al.

[11] Patent Number: 4,639,033
[45] Date of Patent: Jan. 27, 1987

[54] TONNEAU COVER

[76] Inventors: Donald G. Wheatley; Patricia A. Wheatley, both of 4451 Ford Rd., Ann Arbor, Mich. 48105

[21] Appl. No.: 809,167
[22] Filed: Dec. 16, 1985

Related U.S. Application Data

[63] Continuation-in-part of Ser. No. 650,275, Sep. 14, 1984, abandoned.

[51] Int. Cl.$^4$ ............................................. B60J 7/10
[52] U.S. Cl. .................................... 296/100; 160/327
[58] Field of Search ................. 296/100; 160/327, 328

[56] References Cited

U.S. PATENT DOCUMENTS

| 3,373,464 | 3/1968 | Ausnit | 160/327 |
| 3,727,972 | 4/1973 | Belk | 296/100 |
| 4,036,521 | 7/1977 | Clenet | 296/100 |
| 4,061,394 | 12/1977 | Vodin | 296/100 |
| 4,479,677 | 10/1984 | Gulette et al. | 296/100 |

Primary Examiner—Robert R. Song
Attorney, Agent, or Firm—Charles W. Chandler

[57] ABSTRACT

A flexible cover for mounting over the cargo area of a vehicle such as a pickup truck, boat or the like, having resilient, J-shaped extruded fasteners attached along the edges of the cover for fastening it to extruded aluminum rails mounted on the vehicle sidewalls. The J-shaped fasteners are formed of a resilient plastic which is mated with the rails in such a manner as to accommodate variations in the distance between the cargo box sidewalls, as well as variations in the flexibility of the flexible cover. The extruded members are adapted to be snapped together by applying a downward force on the J-shaped fasteners toward the rail until a lip on the rail snaps into the resilient fastener. The cover is removed by unzipping the J-shaped fastener from the rail to expose the cargo box area.

6 Claims, 8 Drawing Figures

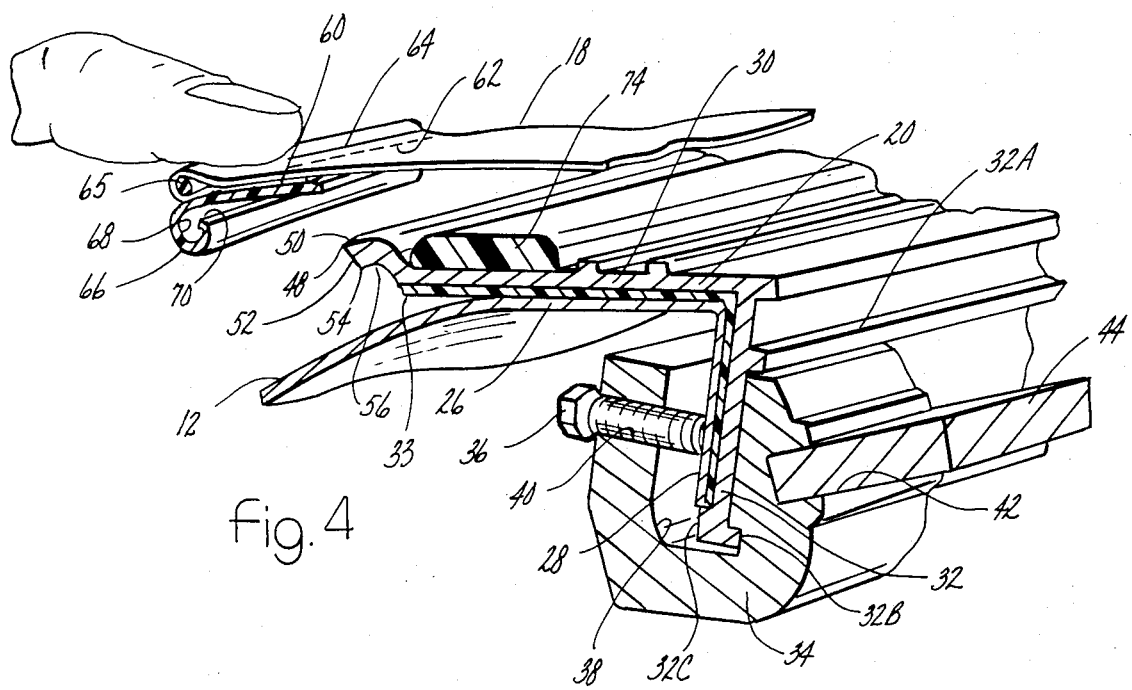

TONNEAU COVER

CROSS-REFERENCE TO RELATED APPLICATIONS

This application is a continuation-in-part of application Ser. No. 650,275, filed Sept. 14, 1984, for CARGO BOX COVER and now abandoned.

BACKGROUND OF THE INVENTION

This invention is related to tonneau covers for enclosing the cargo area of a vehicle, and more particularly to a cover having a resilient "J" shaped extrusion stitched along a side edge of the cover, and a complementary, aluminum extruded lip mounted along the top edge of the cargo box which mates with a curved lip on the resilient fastener. The resilient lip is adapted to unwind like a clock spring to accommodate variations in the distance between the sidewalls of the cargo box as well as variations in flexibility of the cover material. This invention also relates to means for clamping the rail to the cargo box without drilling any special holes.

A tonneau cover is often mounted over the cargo box area of certain vehicles, such as pickup trucks and boats to protect the vehicle interior and contents. Such covers have several problems. For example, the cargo box sidewalls of commercially available pickup trucks frequently vary in width because of manufacturing tolerances. Thus, a cover adapted to accommodate a class of vehicles frequently will be loose on some vehicles and tighter on others because the means for connecting the cover to the sidewalls do not accommodate such dimensional variations.

Another problem is that the tonneau cover is usually formed of a flexible material that can be somewhat stretched. However, in cold weather, the material loses its flexibility and becomes stiff, and thus, hard to install and prone to tear. During warmer weather, the flexible material becomes very soft and flexible, and thus, difficult to tension.

Further, commercially available fastening devices for connecting a tonneau cover to a cargo box are difficult to attach, and in some cases require drilling several holes in the cargo box sidewall which detracts from the ultimate resale value of the vehicle, and in other cases, are relatively complicated and expensive to install.

SUMMARY OF THE INVENTION

The broad purpose of the present invention is to provide an improved cover and fastening structure for the cargo area of a vehicle, such as a pickup truck or boat, in which the fastening structure accommodates variations in the distance between the sidewalls on which the cover is mounted, as well as variations in cover flexibility.

The preferred embodiment of the invention includes a "J" shaped plastic extrusion stitched along the side edge of the cover. The J-shaped extrusion has a curved, resilient lip defining a bight.

A base member or rail, preferably formed of an aluminum extrusion, is mounted along the top of the cargo box sidewall, and has a lip facing away from the cargo box area. The resilient J-shaped fastener is formed in such a manner that applying a downward force on the J-shaped fastener snaps the resilient lip around the edge of the aluminum rail. A tensioning force applied on the cover causes the resilient lip to unwind, like a clock spring, permitting the edge of the cover to move toward the cargo box, without disconnecting the fastening structure.

The rail is mounted on the cargo box sidewall, adjacent an interior, downwardly depending wall, a structural feature of many commercially available pickup trucks. A clamp has a slot for receiving both the lower edge of the sidewall and a vertical wall of the rail. A threaded fastener, mounted behind the sidewall so as to be hidden from view, attaches the rail to the sidewall without drilling any holes. The clamp also has a slot for receiving the end of a wooden slat which spans the cargo box for supporting the midsection of the cover. Although the fastening structure is preferably formed of extruded sections, both the rail and the J-shaped extrusion can be formed of any structure having a uniform cross section along its length such as a plastic molding or a rolled form strip of metal.

Another advantage of the inventive fastening structure is that it provides a continuous connection along the cover edge, thereby preventing wrinkles and eliminating concentrated loads in commonly used materials such as automotive quality vinyl. When the cover is removed, the rail, preferably formed of a bright, anodized aluminum provides an attractive appearance and protects the top of the cargo box from damage.

Thus, the preferred tonneau cover protects the cargo in the cargo area. The resilient "J" section maintains an even tension for a taut wrinkle free cover. The aluminum rails mounted along the top edges of the cargo box walls provide an attractive appearance when the cover is removed. The rails can be easily installed without damage to the truck. The cover can be easily mounted on the rails, or quickly removed by an unzipping action in which the user grasps a corner of the cover and raises it to progressively separate the two extrusions along their length.

Still further objects and advantages will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIGS. 4–6 are views illustrating the manner in which the J-shaped extrusion is connected to the rail lip; and FIGS. 7–8 show the manner in which the J-shaped extrusion is connected to the rail in a loose and in a taut cover condition, respectively.

DESCRIPTION OF THE PREFERRED EMBODIMENT

Figure 1:
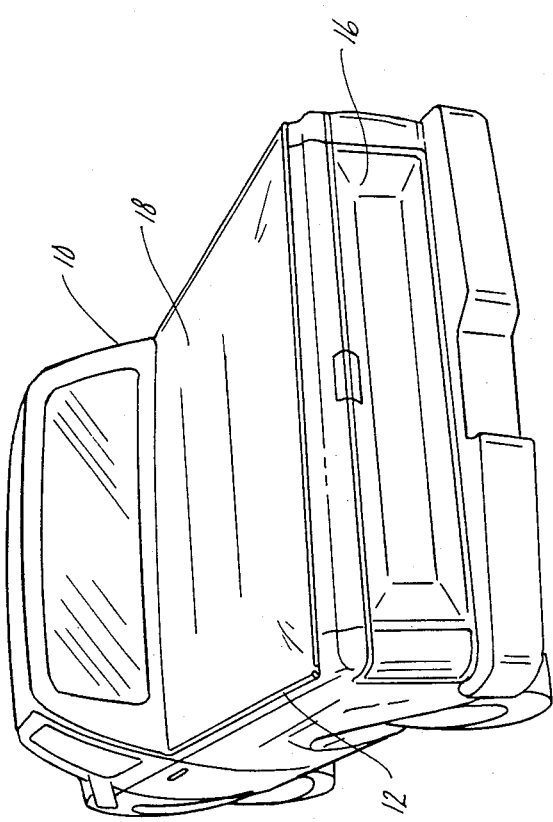
FIG. 1 is a view showing the preferred tonneau cover mounted on the cargo box of a conventional pickup truck.
Figure 2:
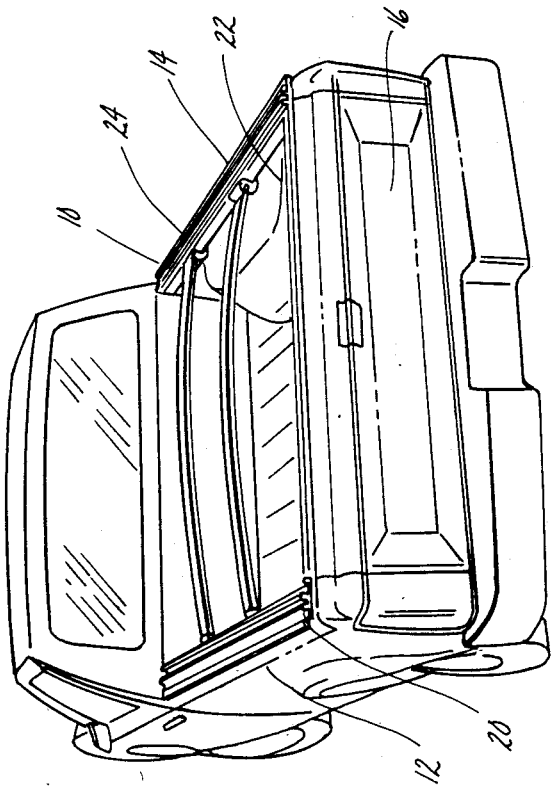
FIG. 2 is a view similar to FIG. 1, but showing the cover removed from the fastening rail.

FIGS. 1 and 2 illustrate a conventional pickup truck 10 having a pair of sidewalls 12 and 14, and tailgate 16. The sidewalls and tailgate partially enclose the cargo box area of the vehicle. A vinyl fabric cover 18 is mounted on the sidewalls to protect the interior of the cargo box as well as its contents. The cover is preferably formed of a flexible, stretchable fabric.

Extruded aluminum rails 20, 22 and 24 are mounted along the top of sidewall 12, tailgate 16 and sidewall 14, respectively. The cross-section of the rails 20 and 24 are identical, and the tailgate rail is similar to the side rails. Rail 20 is shown in FIG. 4 for illustrative purposes.

Referring to FIG. 4, the cargo box sidewalls, such as sidewall 12, is formed of sheet metal with a horizontal wall 26 and a downward depending, vertical wall 28. Rail 20 has a horizontal section 30 mounted on horizontal wall 26, and a vertical section 32 which is mounted adjacent vertical wall 28. Liner 33 of a high density polyethylene material is mounted between the rail and the sidewall to prevent squeaks and scratches.

A plurality of clamping means identical to clamp 34 and fastener 36, are mounted along the sidewalls and the tailgate for fastening the rails to the cargo box walls. Clamp 34 has a comewhat "C" shaped configuration with a slot 38 receiving both the lower edge of wall 28 and vertical section 32 of the rail. The width of the slot is greater than the combined thickness of the sidewall and the rail. The vertical wall of the rail has a pair of lips 32A and 32B for locating the clamp, and another lip 32C for locating the lower edge of liner 33.

Fastener 36 is received through a threaded opening 40 in the clamp to securely attach both the clamp and the rail to the sidewall. Fastener 36 is preferably a cadmium plated fastener with rust resistant properties.

This clamping arrangement eliminates the necessity for drilling any holes into the cargo box sheet metal. Each fastener is concealed behind the sidewalls so as not to scratch the contents of the cargo box.

The side of each clamp has a slot 42 for receiving the end of a slat 44 preferably made of wood. Slat 44 is one of several, each mounted with their ends mounted in the slots 42 of the clamps 34 to support the midsection of cover 18.

The outer edge of the rail has a lip 48 which extends away from the cargo box area. A similar lip is mounted on the companion rail 24 on the opposite side of the cargo box which also faces away from the cargo box. Lip 48 is defined by an upper cam surface 50 and a lower cam surface 52 which intersect to define a pointed edge. The lower edge of cam surface 52 terminates in ridge 54 and slot 56. The entire lip area is raised above the body of horizontal wall 30.

A "J" shaped, extruded fastener 60 of a polyethylene plastic is stitched at 62 to the edge of cover 18. The cover is also stitched at 64 to a plastic, stiffening rod 65. Fastener 60 has a curved lower lip 66 forming a partially cylindrical bight 68 for receiving rail lip 48. Lip 66 is resilient such that the extreme edge 70 of the fastener can be moved toward or away from the bight and the lip can unwind like a clock spring. In its relaxed condition, edge 70 forms an opening for receiving rail lip 48.

FIGS. 5 and 6 illustrate how fastener 60 is connected to the rail by mounting lip 66 on the rail and then pressing downwardly. As the extreme edge of lip 66 engages cam surface 50 of the rail, lip 66 is cammed inwardly until it passes the extreme edge of the rail and then pops outwardly as illustrated in FIG. 6.

A tensile force on the cover in the direction 72, as illustrated in FIG. 8, will then cause rail lip 48 to be received into the bight of curved lip 66 until the extreme edge 70 of the curved lip slides over ridge 54 into slot 56. Lip 66 is trapped in slot 56 until the user deliberately makes a separating motion to release the cover from the sidewall.

FIG. 7 illustrates cover 18 somewhat slack such that there is a loose fit between rail lip 48 and resilient lip 66. However, in FIG. 8, the application of a tensile force on the cover will then cause the curved lip to essentially unwind in such a manner that, although it remains engaged in slot 56, the cover can move a distance "A" while being continuously in a taut condition. This unwinding feature permits the fastening structure to accommodate the stretching qualities of the vinyl cover as well as variations in the distance between the sidewalls of pickup trucks, where the dimensional tolerances may vary as much as a ¼ inch. Further the resilient extruded lip accommodates changes in the flexibility of the cover that occur in response to temperature changes. For example, in extremely cold weather, the cover tends to become stiff whereas in warm weather it tends to become very loose. Thus, the preferred fastening structure eliminates wrinkles in the cover because it always applies a tensile force to the cover.

An identical "J" shaped fastener is connected to the opposite sidewall to cooperate with rail 24 in maintaining the cover in a taut condition.

Referring to FIG. 4, an extruded plastic molding 74 is adhesively attached to horizontal section 30 of rail 20.

Figure 3:
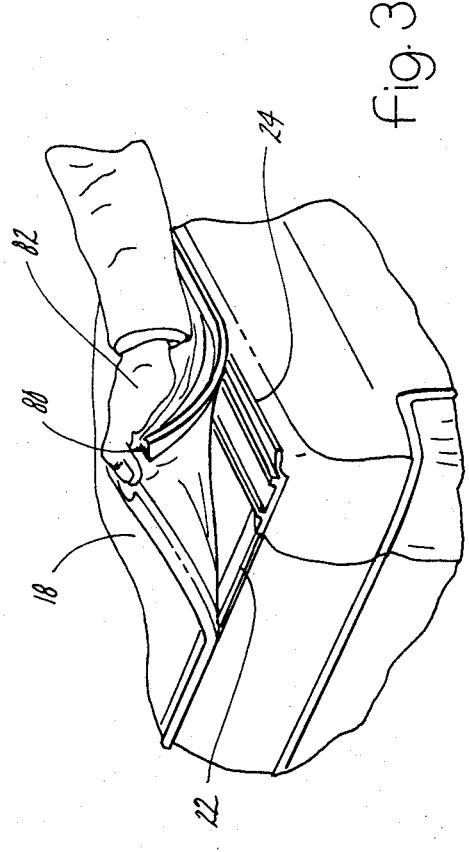
FIG. 3 is a view showing the corner of the cover raised prior to being unzipped from the cargo box.

Referring to FIG. 3, cover 18 is illustrated partially separated or unzipped from rails 22 and 24. The J-shaped fastener has the flexible curved lip trimmed away a couple of inches at 80 so that user 82 can grasp the cover corner and progressively slidably unfasten or unzip the cover from the top rail by an upward motion that unwinds curved section 66 so that the extreme edge 70 of the lip clears ridge 54 and is separated from the rail.

Thus it is to be understood that we have described an improved tonneau cover for the cargo area of a vehicle such as a pickup truck, a boat or the like employing a novel clamp for fastening the rail to the sidewalls without requiring any additional holes to be drilled and which also accommodates the tonneau slats. In addition, we have described a novel fastener structure which accommodates variations in flexibility of the cover as well as variations in the distance between the sidewalls, and which also permits the cover to be quickly and easily zipped to or unzipped from the top of the cargo box.

Having described our invention, we claim:

1. Tonneau means for covering the cargo area of a vehicle, such as a boat, a pickup truck or the like, said vehicle having a pair of spaced sidewalls, each sidewall having a lower edge, comprising:

a flexible cover having a side edge, the cover being adapted to fit over the cargo area of the vehicle;

a rail having a horizontal upper wall and a depending vertical wall, the rail being disposed on the top of the sidewall;

a clamping member having a slot receiving the lower edge of the sidewall and the depending vertical wall of the rail;

a fastener member mounted on the clamping member for engaging both the sidewall and the vertical wall of the rail in the clamping member slot; and means for releasably fastening the cover to the rail whereby the cover is connected to the sidewall without the necessity for forming any holes in the sidewall for the fastener member.

2. A combination as defined in claim 1, including an elongated tonneau slat having its ends supported on opposite sides of the cargo area for supporting the flexible cover, and in which the clamping member has a second slot for receiving one of the ends of the slat.

3. A combination as defined in claim 1, in which the first mentioned slot is wider than the combined thickness of the depending sidewall and the rail vertical wall.

4. A combination as defined in claim 1, in which the rail is formed of an aluminum extrusion.

5. A combination as defined in claim 1, in which the fastener member is mounted on one side of the sidewall and the clamping member has a second slot on the opposite side of the sidewall for accommodating the end of a tonneau slat.

6. Means for covering the cargo box of a vehicle, such as a boat, pickup truck, or the like, said vehicle having a pair of spaced sidewalls, each sidewall having a vertical wall with a lower edge, comprising:

a stretchable cover having a pair of side edges and adapted to be disposed over the cargo area of the vehicle;

a rail mounted along the top of each sidewall, the rail having a horizontal upper wall disposed on the cargo box sidewall and a depending vertical wall disposed adjacent the vertical wall of the cargo box sidewall;

a pair of C-shaped clamps, one of the clamps engaging one of the sidewalls of the cargo box and the vertical wall of the rail mounted on such sidewalls, and the other clamp engaging the vertical wall of the other rail and the vertical wall of the other sidewall;

fastener means engaging each of the clamping members to its respective sidewall, each clamping member having a slot for receiving a tonneau slat;

a tonneau slat having its ends disposed in the slots of the clamping members;

the rails each having a lip facing in the opposite direction with respect to the other rail;

a resilient J-shaped extruded fastening member connected along opposite side edges of the cover, each J-shaped member having a curved section, the curved section having an extreme edge defining a resilient bight, the bight of each J-shaped member receiving the lip of a rail in such a manner that a tensile force applied to the cover causes the J-shaped member to unwind, thereby permitting the side edges to move away from the sidewall while remaining connected to the rails.

* * * * *